United States Patent
Oh et al.

(10) Patent No.: US 8,363,164 B2
(45) Date of Patent: Jan. 29, 2013

(54) APPARATUS AND METHOD FOR OUTPUTTING IMAGE USING A PLURALITY OF CHROMA-KEY COLORS

(75) Inventors: Seung-taek Oh, Yongin-si (KR); Jung-khun Byun, Gwangjang-dong (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1773 days.

(21) Appl. No.: 11/656,371

(22) Filed: Jan. 23, 2007

(65) Prior Publication Data

US 2007/0216811 A1  Sep. 20, 2007

(30) Foreign Application Priority Data

Mar. 14, 2006  (KR) .................. 10-2006-0023636

(51) Int. Cl.
*H04N 9/75* (2006.01)
(52) U.S. Cl. .................. 348/592; 348/584; 348/587
(58) Field of Classification Search .......... 348/584–590, 348/599, 578, 563–565, 569, 591–592; *H04N 9/75*
See application file for complete search history.

(56) References Cited

U.S. PATENT DOCUMENTS

| | | | | |
|---|---|---|---|---|
| 5,381,184 A * | 1/1995 | Gehrmann | ............ | 348/586 |
| 5,500,684 A * | 3/1996 | Uya | ............ | 348/592 |
| 5,657,095 A * | 8/1997 | Yoshida et al. | ............ | 348/584 |
| 6,023,302 A * | 2/2000 | MacInnis et al. | ............ | 348/597 |
| 6,084,982 A * | 7/2000 | Challapali et al. | ............ | 382/166 |
| 6,262,778 B1 * | 7/2001 | Nonweiler et al. | ............ | 348/586 |
| 7,528,890 B2 * | 5/2009 | Staker et al. | ............ | 348/584 |

FOREIGN PATENT DOCUMENTS

| | | |
|---|---|---|
| JP | 58-46782 A | 3/1983 |
| JP | 7-274199 A | 10/1995 |
| JP | 2004-171591 A | 6/2004 |

* cited by examiner

*Primary Examiner* — Trang U Tran
(74) *Attorney, Agent, or Firm* — Sughrue Mion, PLLC

(57) ABSTRACT

An apparatus which outputs an image using a plurality of chroma-key colors is provided. The apparatus includes a chroma-key-color-storage unit that stores multiple chroma-key colors; a microprocessor unit (MPU) that sets a block where the chroma-key color is applied using a pixel address of a foreground image; and a video controller that composes a background image and the foreground image using the block set by the MPU, and displays the composed image in the display unit.

8 Claims, 5 Drawing Sheets

(Prior Art)

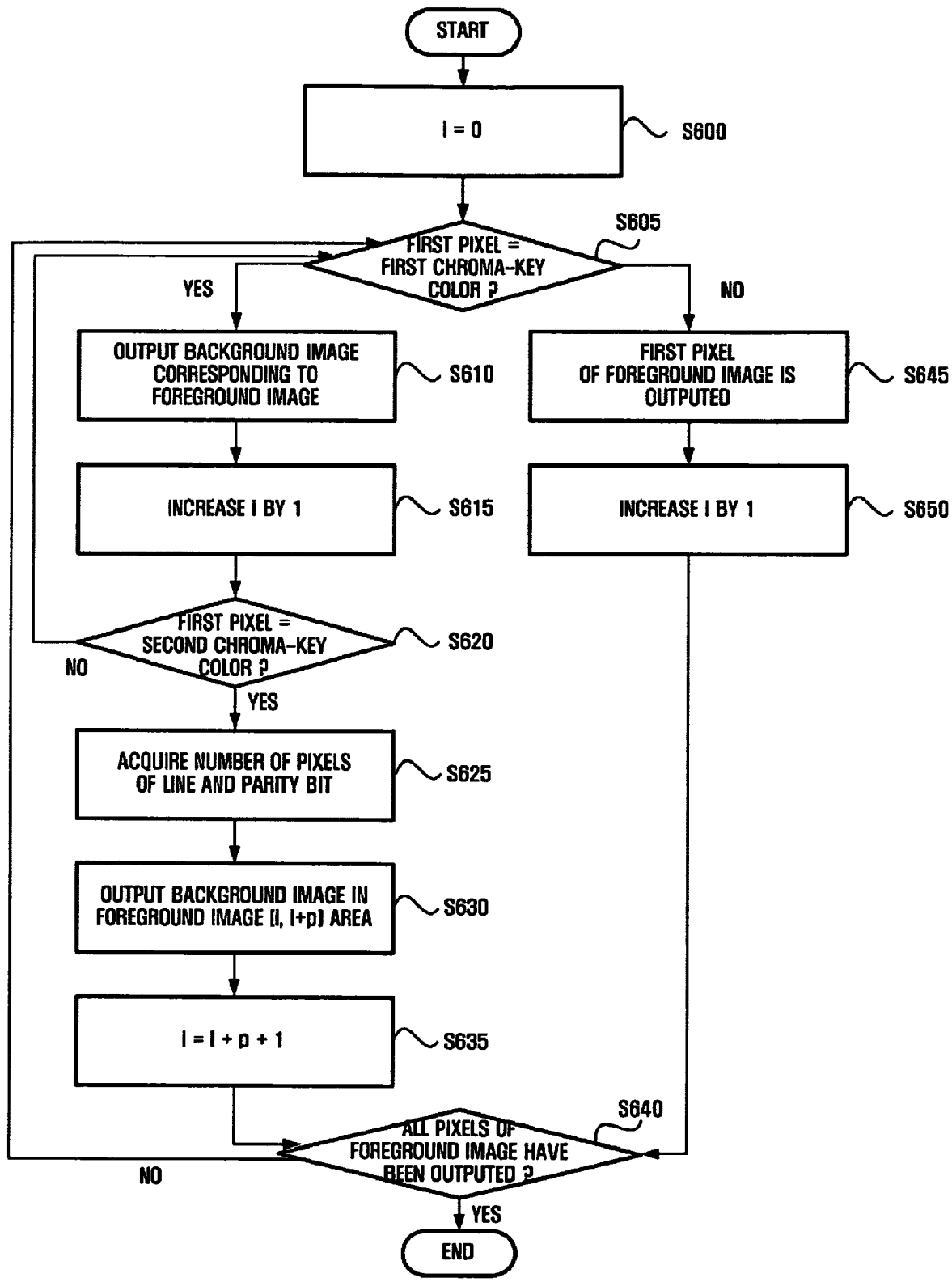

APPARATUS AND METHOD FOR OUTPUTTING IMAGE USING A PLURALITY OF CHROMA-KEY COLORS

CROSS-REFERENCE TO RELATED APPLICATION

This application is based on and claims priority from Korean Patent Application No. 10-2006-0023636 filed on Mar. 14, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to reducing errors that may occur in an on-screen display (OSD) image output device while outputting an image using a chroma-key as a color. More particularly, the present invention relates to an apparatus and method for outputting an image using a plurality of chroma-key colors that sets a block in a foreground image where the chroma-key is applied, applies N chroma-keys (at least two or more) in a predetermined area of the set block, and combines the foreground image with a background image by including p pixels that excludes n pixels and a parity bit in a horizontal line at the $(N+1)^{th}$ pixel.

2. Description of the Related Art

A chroma-key-color-application method, which is one of the methods for composing two images in an OSD image output device, applies a chroma key color to one of two images, which can be a background or a foreground.

The chroma-key color is an effect used when substituting an image by another image or color using a certain color of the image as a key (alpha channel). Keying refers to a process of superimposing a certain part of another image on a certain part of a random image, and refers to a process where an image or a caption to be composed is shown superimposed on the background image. Three types of keys: a chroma key, a luminance key and an external key are currently used in broadcasting and other fields.

A frame buffer is a memory device that temporarily stores image information to be shown on a screen using the raster scan method. A graphics processor receives a display list that expresses a figure from the CPU, converts the list, and records the converted list in the frame buffer. Each memory unit of the frame buffer is reflected on the screen as it is.

FIG. 1 illustrates the structure of an OSD image output device in the related art.

This device includes a system memory 100, a video controller 130, a display unit 160, and a microprocessor unit (MPU) 190.

The system memory 100 includes a background-frame buffer 110 that stores a background image 170, and a foreground-frame buffer 120 that stores a foreground image 180.

The video controller composes the foreground image 180 with the background image 180 where a chroma-key color can be applied in the MPU 190, and displays the composed image in the display unit 160 as if outputting one image.

The control logic 140 of the video controller 130 includes a chroma-key-color-storage unit 150 that stores one chroma-key color.

The MPU 190 applies the chroma-key color to the foreground image 180 using a chroma-key color stored in the chroma-key-color-storage unit 150, and applies the chroma-key color for all pixels of a part where the chroma-key color is applied in the foreground image 180.

FIG. 2 illustrates a method of outputting an OSD image according to the related art.

This method composes a background image 170 and a foreground image 180 where a chroma-key color is applied through the video controller 130, and displays the composed image as one image.

There is a window A 200, which is capable of reproducing video, and a window B 210 which may be used for some other purpose, and there is also a portion where window A 200 and window B are overlapped in a window system.

In other words, when composing the foreground image 180 width the background image 170, a predetermined area 220 of the foreground image, overlapped width window B 210, is handled to be transparent so that the window B 210 is not covered.

In order to make the area 220 transparent by applying one chroma-key color stored in the chroma-key-color-storage unit 150 to all pixels of the area 220 of the foreground image, the area 220 of the composed image 230 is handled to be transparent so that the window B 210 is not covered.

Likewise, according to the related art, the chroma-key color is applied to all pixels of the predetermined area 220, where the window A 200 and the window B 210 are overlapped, using one chroma-key color stored in the chroma-key-color-storage unit 150.

In the case where the foreground image 180, where the chroma-key color is applied, is not a still image, but a video, applying the chroma-key color to all pixels can lower the performance of the MPU 190 that applies the chroma-key color, and can lower the system performance by the overhead generated in the video controller 130 that composes the background image 170 and the foreground image 180 and displays the combined image.

Further, in the case where there is a color that is the same as the chroma-key color stored in the chroma-key-color-storage unit in the area where the window A 200 and the window B 210 are overlapped, the area can be erroneously shown as a transparent image when combined.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention is to provide an apparatus and method for outputting an image using a plurality of chroma-key colors, which can reduce errors that can be generated when outputting an image.

The present invention will not be limited to the technical aspects described above. Other aspects not described herein will be more definitely understood by those in the art from the following detailed description.

According to an aspect of the present invention, there is provided an apparatus for outputting an image using a plurality of chroma-key colors, the apparatus including a chroma-key-color-storage unit that stores multiple chroma-key colors; a microprocessor unit (MPU) that sets a block where the chroma-key color is applied using a pixel address of a foreground image; and a video controller that composes a background image and the foreground image using the block set by the MPU, and displays the composed image in the display unit.

According to an aspect of the present invention, there is provided a method of outputting an image using a plurality of chroma-key colors, the method including selecting a block to apply multiple chroma-key colors; determining the number of pixels included in a horizontal line within the block; applying at least two or more chroma-key colors among multiple chroma-key colors; and recording the number of pixels of the horizontal line and the parity bit in the next pixel where the chroma-key color has been applied.

According to an aspect of the present invention, there is provided a method of outputting an image using a plurality of chroma-key colors, the method including determining whether the $i^{th}$ pixel of a foreground, which includes a block where n (at least 2) chroma-key colors are applied, is one among the n chroma-key colors; determining the $(i+1)^{th}$ pixel of the foreground image is a remaining color among n chroma-key color 3s, and reading the number of pixels "p" recorded in the $(i+1)^{th}$ pixel of the foreground image; and composing the foreground image and a background image in the (i, i+p) area of a horizontal line where the $i^{th}$ pixel and the $(i+1)^{th}$ pixel of the foreground image are included, and displaying the composed images together.

BRIEF DESCRIPTION OF THE DRAWINGS

The above and other aspects of the present invention will become apparent by describing in detail exemplary embodiments thereof with reference to the attached drawings, in which:

FIG. 6 is a flowchart illustrating the composition of a foreground image where a plurality of chroma-key colors have been applied and a background.

DETAILED DESCRIPTION OF THE EXEMPLARY EMBODIMENTS

Figure 1:
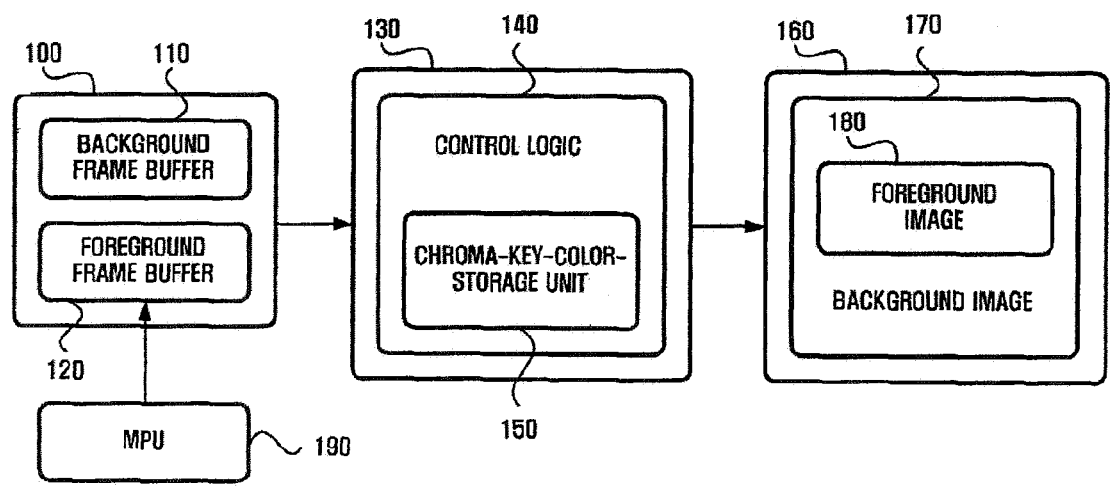
FIG. 1 illustrates the structure of an apparatus for outputting an on screen display (OSD) image according to the related art.

Exemplary embodiments of the present invention will be described in detail width reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the exemplary embodiments of the present invention, "h" is the height of a block; "l" is the width of a block; "m" is multiple chroma-key colors stored in a chroma-key-color-storage unit; "n" is the number (at least 2) of chroma-key colors among m chroma-key colors actually applied to a chroma-key-color-application area; "k" is the number of multiple blocks; "p" is the number of pixels after n chroma-key colors are consecutively applied within a horizontal line in the horizontal line that includes actually-applied n chroma-key colors; and "i" represents a pixel of the horizontal line.

Figure 3:
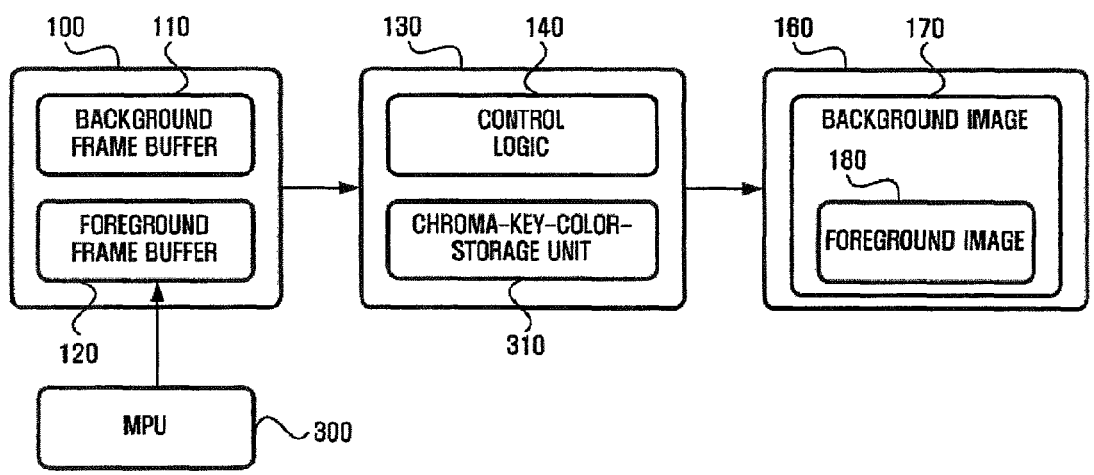
FIG. 3 illustrates the structure of an apparatus for outputting an OSD image according to an exemplary embodiment of the present invention.

FIG. 3 illustrates the structure of an apparatus for outputting an on screen display (OSD) image according to an exemplary embodiment of the present invention.

This apparatus includes a system memory 100, a video controller 130, a display unit 160, and a microprocessor unit (MPU) 300.

The system memory 100 may include a background-frame buffer 110 that stores a background image 170, and a foreground-frame buffer 120 that stores a foreground image 180, e.g., a still image or a video. The system memory is a storage medium that can store the foreground image 180 where a plurality of chroma-key colors have been applied thereto and composite output images.

Figure 2:
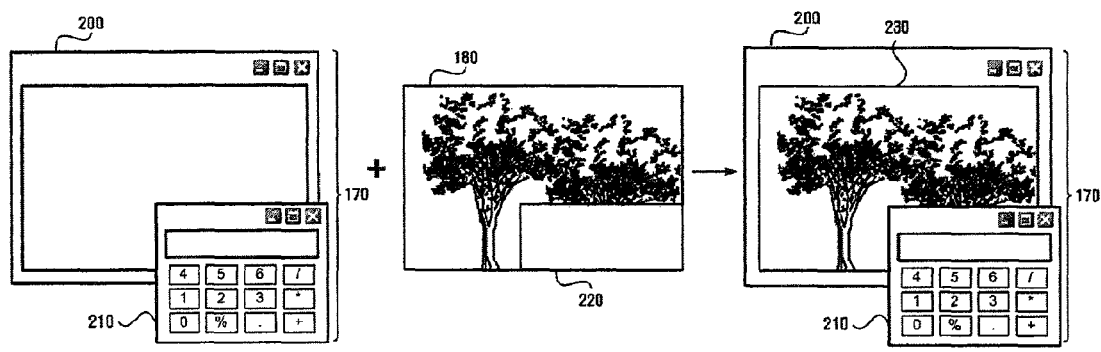
FIG. 2 illustrates a method of outputting an OSD image according to the related art.

The background image 170 includes both window A 200 and window B 210 of FIG. 2. The foreground image 180 can be a still image or a video displayed in a specified area of the background image 170.

The MPU 300 sets an area 220 where window A 200 and window B 210 of the background image 170 are overlapped as a block 410, applies a chroma-key color to the block 410, and handles the area 220 of the foreground image 180 corresponding to the block 410 in order to make the area 220 transparent so that the area of the window B 210 is not covered by the foreground image 180. The MPU 300 calculates the height "h" and the width "l" of the block 410, and records the number of pixels "p" of the horizontal line and the parity bit.

The MPU 300 can set a block 410 by getting the height and the width of the area where window A 200 and window B 210 are overlapped using a physically-fixed value of the display device (not shown), a display pointer, and the pixel address of the foreground image 180. The height "(h" of the block 410 can be the total number of horizontal lines, and the width "l" can be the number of pixels "p" that can be included in one horizontal line.

Because there can be windows other than window B 210 in the block 410 set in the MPU 300, "k" blocks 410 can be set.

Figure 4:
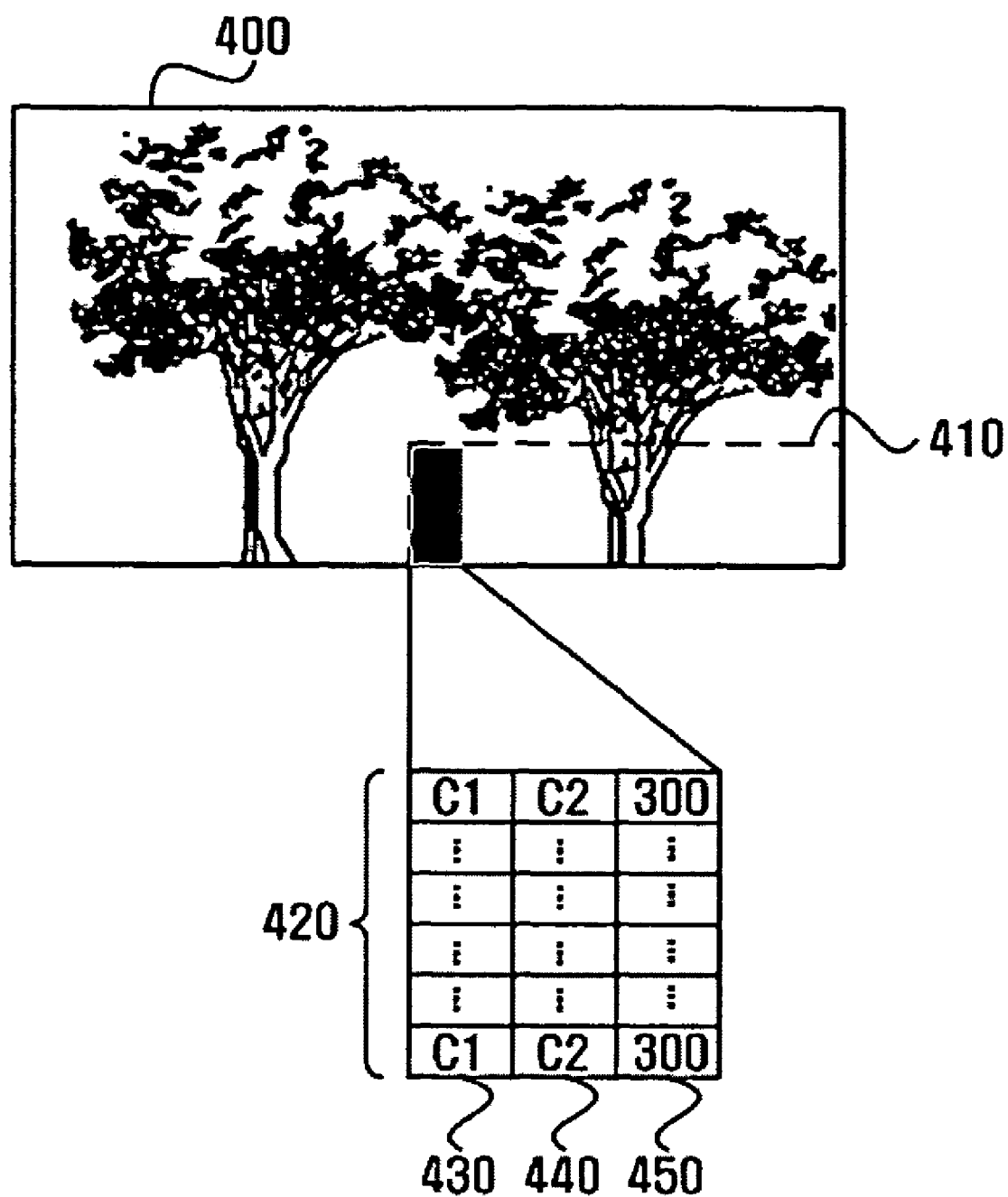
FIG. 4 illustrates a foreground where a block setting and a plurality of chroma-key colors have been applied according to an exemplary embodiment of the present invention.

There is the chroma-key-color-application area 420 of FIG. 4 within the set block 410, and n (at least 2) chroma-key colors can be applied to the chroma-key-color-application area 420. Further, the number of pixels "p" except the n pixels and the parity bit can be included in the horizontal line where n chroma-key colors are included in the $(n+1)^{th}$ pixel. Here, the number of pixels "p" can be the width of the block "l" minus the number of actually-applied chroma-key colors "n".

In the chroma-key-color-application area 420, the case, where n (at least 2 or more) chroma-key colors among multiple chroma-key colors are applied, can be recognized as the chroma-key color.

When "m" is the number of chroma-key colors and "n" is the number of actually-applied chroma-key colors, the range for "m" and "n" is: $m \geq n \geq 2$.

The video controller includes a control logic 140 that handles a general OSD, and a chroma-key-color-storage unit 310 that can store multiple chroma-key colors. The block 410 stored in the system memory 100 is set, and the foreground image 400, where n chroma-key colors have been applied, and the background image 170 is composed so that the composed image is outputted in the display unit 160.

The background image 170 and the block 410 are set, and the composition width the foreground image 400, where the chroma-key color has been applied, can be performed while reading all pixels of the horizontal line of the foreground image 400.

While reading pixels of the foreground image 400 as the horizontal line and indicating them in the display unit 150, the block 410 set in the MPU can be found.

The chroma-key-color-application area 420 is within the found block 410, and it is determined whether chroma-key colors applied to the area 420 matches n (at least 2) chroma-key colors among multiple chroma-key colors "m" stored in the chroma-key-color-storage unit 310.

In the case where n chroma-key colors are applied and displayed, the $(n+1)^{th}$ pixel of the horizontal line is read, and pixels of the background image 170 are displayed altogether, which corresponds to the number of pixels "p" of remaining pixels except pixels where n chroma-key colors have been applied using the number of pixels recorded to the $(n+1)^{th}$ pixel and the parity bit.

If n chroma-key colors are applied in one horizontal line, n chroma-key colors are applied in the aforementioned manner to all horizontal lines as high as the block 410, and thus the background image 170 can be displayed in the area that overlaps the width of the window B 210 at one time.

The display unit 160 composes the background image 170 composed in the video controller 130 and the foreground image 400 where chroma-key colors are applied, and displays the composed image.

FIG. 4 illustrates a foreground where a block setting and a plurality of chroma-key colors have been applied according to an exemplary embodiment of the present invention.

The foreground image 400, where the block setting and a plurality of chroma-key colors have been applied, can include the block set in the MPU 300 and the chroma-key-application area 420.

The foreground image 180, which is stored in the foreground frame buffer 120 of the system memory 100, may be a still image or a video.

The MPU 300 can set a block 410 using a physically-fixed value of the display device, the display pointer, and a pixel address in the foreground image 180. The height "h" of the set block 410 is the number of horizontal lines, and the width "l" is the number of pixels included in one horizontal line.

If the block 410 is set using the pixel address, n chroma-key colors can be applied to the chroma-key-color-application area 420 using n (at least 2) chroma-key colors among multiple chroma-key colors stored in the chroma-key-color-storage unit 310.

The chroma-key-color-application area 420 can include n pixels 430 and 440, the number of remaining pixels "p" except the n pixels in the width "l" of the block 410, and the $(n+1)^{th}$ pixel 450 where the parity bit is recorded.

For example, in the case where two chroma-key colors are stored in the chroma-key-color-storage unit 310, the chroma-key color can be applied using three pixels in the chroma-key-color-application area 420. In other words, an arbitrary first chroma-key color among two chroma-key colors can be applied to the $i^{th}$ pixel 430 of the horizontal line, and a second chroma-key color can be applied to the $(i+1)^{th}$ pixel. Two chroma-key colors are applied in order to reduce errors in the composed-image output by recognizing the case, where n chroma-key colors are consecutively displayed when composing images in the video controller 130, as a chroma-key color.

The $(i+2)^{th}$ pixel 450 of an arbitrary horizontal line of the chroma-key-color-application area 420 is a pixel where the number of pixels "p" and the parity bit are recorded. The number of pixels "p" of the horizontal line except the $i^{th}$ pixel 430 and the $(i+1)^{th}$ pixel 440, and the parity bit can be recorded in an arbitrary horizontal line. The $(i+1)^{th}$ pixel can be the pixel that corresponds to the $(i+1)^{th}$ pixel mentioned above.

In the case where the number of pixels "p", which is recorded in the $(i+2)^{th}$ pixel of an arbitrary horizontal line of the chroma-key-color-application area 420, is 300, 300 is recorded. If the number is recorded as a binary number, 100101100 of 9 bits are recorded; it can be recorded as a binary number of 10 bits by making the parity bit 0 the $10^{th}$ bit. Likewise, the number of pixels "p" (300) can be expressed differently depending on the amount of information that can be recorded in the pixel, or the bits.

If the chroma-key color is applied to one horizontal line, the same process can be repeated in the remaining lines that correspond to the height "h" of the block 410.

Figure 5:
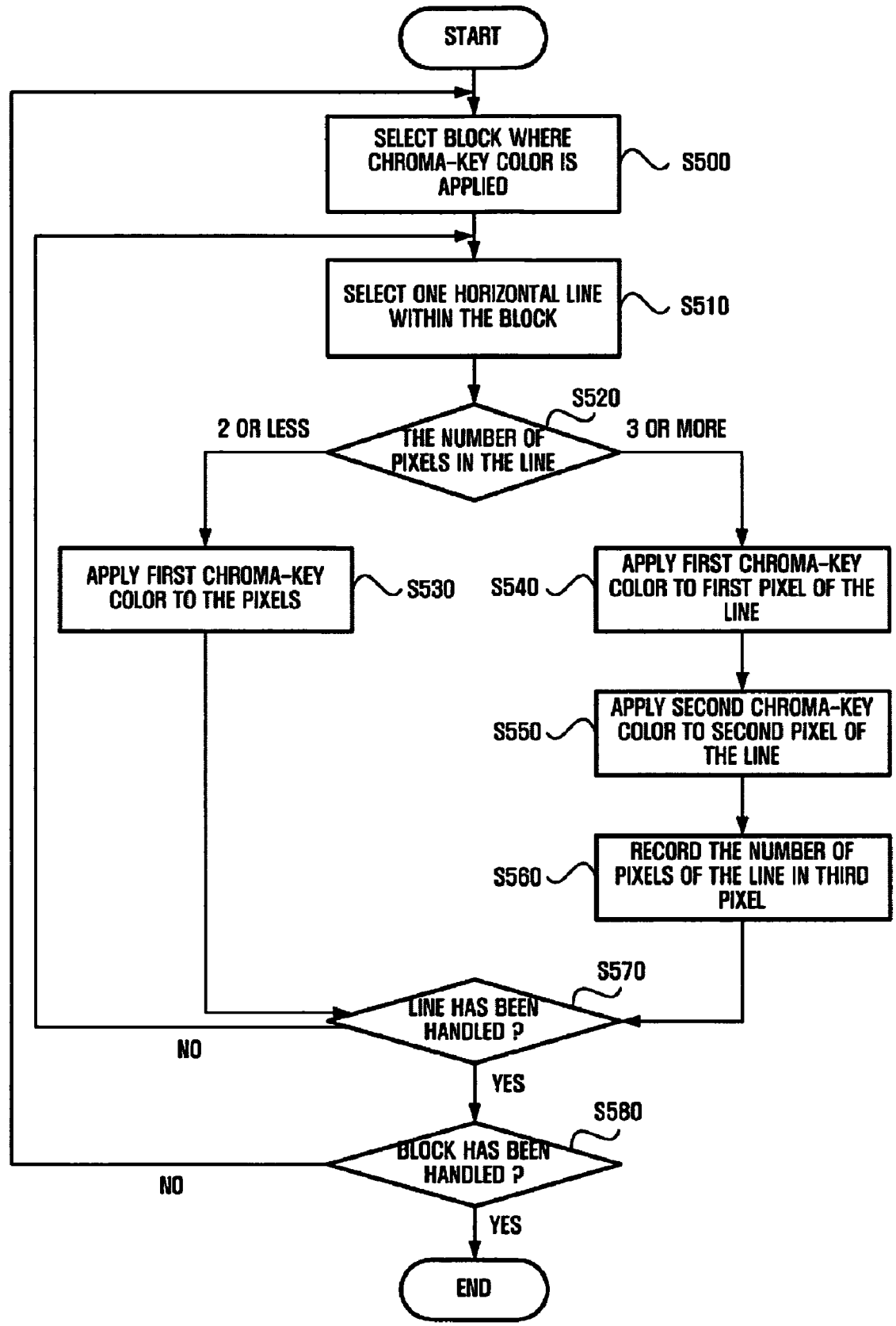
FIG. 5 is a flowchart illustrating setting an area where a plurality of chroma-key colors are applied according to an exemplary embodiment of the present invention.

FIG. 5 is a flowchart illustrating setting an area where a plurality of chroma-key colors are applied according to an exemplary embodiment of the present invention.

The setting of the block and the application of the chroma-key color using a plurality of chroma-key colors can be performed in the MPU 300.

First, in the case where there are k blocks where chroma-key colors can be applied to the foreground image 180, the block 410 closest to the first pixel is selected S500. It is because when the background image 170 and the foreground image 400 are composed, the composition can be performed while reading from the first pixel of the foreground image. Further, the block 410 can be selected by the MPU 300 or the user.

The selected block can be set by getting the height "h" and the width "l" using the physically-fixed value of the display device and the display pointer of the foreground image 170. The height of the block 410 represents the total number of the horizontal line included in the block 410, and the width "l" represents the number of pixels that can be included in one horizontal line included in the block 410.

If one block 410 is selected among a plurality of blocks 410 S500, one horizontal line within the block 410 is selected in operation S510.

The total number of pixels included in the selected horizontal line is determined based on the width "l" of the block 410 in operation S520.

In the case where the number of pixels of the horizontal line is 2 or less, n (at least 2) chroma-key colors can be applied among m chroma-key colors in operation S530. In the case where the number of pixels of the horizontal line, where the chroma-key color is applied, is "1", an arbitrary chroma-key color can be applied among n chroma-key colors. In the case where the number of the pixels is "2", an arbitrary chroma-key color or both chroma-key colors can be applied.

In the case where the number of pixels of the horizontal line is "3" or more in operation S520, the first chroma-key color among multiple chroma-key colors stored in the chroma-key-color-storage unit is applied to the first pixel of the horizontal line in operation S540, and the second chroma-key color is applied to the second pixel of the horizontal line in operation S550. Two chroma-key colors should be consecutively applied. In other words, the consecutive application of n chroma-key colors is understood as the application of the chroma-key color, and thus when composing images in the video controller 130, the area can be handled to be transparent.

If the first and second chroma-key colors are applied to the first and second pixels of the horizontal line in operations S540 and S550, the number of pixels and the parity bit thereof are recorded in the third pixel of the horizontal line in operation S560.

In the pixel 450 where the number of pixels and the parity bit are recorded, the number of pixels "p" is the number of remaining pixels except two pixels where the chroma-key color has been applied in the horizontal line. The parity bit corresponds to the number of the pixels "p", and is used to check errors that can occur when composing images by keeping the number of 1s always even or always odd.

If the number of pixels "p" and the parity bit are recorded in operation S560, it is determined whether the chroma-key colors have been applied to all horizontal lines as high as the set block 410 in operation S570. If the chroma-key color is not applied to a certain horizontal line, operations 510 to 570 are repeatedly performed until applied to all horizontal lines.

If the chroma-key color is applied to all horizontal lines within one block 410, the application for remaining blocks 410 is determined in operation S580.

In the case where there are other blocks 410 where the chroma-key color can be applied, operations S500 to S570 can be repeatedly performed.

Through such processes, the block where the chroma-key color is applied is set, n chroma-key colors, the number of pixels "p" and the parity bit are applied to the chroma-key-color-application area within the block 410, and thus, the result can be used when composing images in the video controller 130.

FIG. 6 is a flowchart illustrating the composition of a foreground image where a plurality of chroma-key colors have been applied and a background.

The composition of the foreground image where the chroma-key color has been applied can be performed in the video controller 130 using the block set in the MPU 300.

The composition of the background image 170 of the video controller 130 and the foreground image 400 that includes the chroma-key-color-application area 420 can be performed while reading pixels of the horizontal line.

In the case where the height "h" and the width "l" of the block set in the MPU 300 are 100 and 303, respectively, and there are 2 chroma-key colors, the composition of the foreground image 400, where n chroma-key colors are applied in the video controller 130, and the background image 170 are started in the state where i is 0 in operation S600.

The video controller 130 determines whether the $i^{th}$ pixel of the foreground image 400 is the first chroma-key color while reading pixels of the foreground image 400 one by one in operation S605. The fact that "i" is "0" indicates the pixel before the chroma-key-color-application area 420 where the chroma-key color has been applied.

In other words, it is determined whether the pixel coincides with the first chroma-key color among two chroma-key colors stored in the chroma-key-color-storage unit 310 in order to distinguish the chroma-key-color-application area from other areas in operation S605.

In the case the $0^{th}$ pixel of the foreground image is not the first chroma-key color, the $i^{th}$ pixel of the foreground image is outputted in operation S645. Because the first chroma-key color has not been applied to the $0^{th}$ pixel, the pixel corresponding to the $0^{th}$ pixel can be outputted.

The $0^{th}$ pixel is outputted in operation S645, and "i" is increased by 1 in order to read the next pixel in operation S650, and it is determined whether each pixel needs to be outputted for all pixels of the foreground image 400 in operation S640.

In the case where all pixels of the foreground image have been outputted, the process is terminated, but in the case where there are one or more pixels that have not been outputted, the process goes back to the step where it is determined whether the $i^{th}$ pixel is the first chroma-key color in operation S605. Currently, "i" has increased from 0 to 1 in operation S650.

In the case where the $1^{st}$ pixel and the first chroma-key color are not the same, the pixel of the background image 170, which corresponds to the foreground image 400, is outputted in the display unit 160 in operation S610. The background image is outputted in order not to cover the area, where the window A 200 and the window B of the background image are overlapped, by making the chroma-key-color-application area transparent.

If the background image 170 is outputted in operation S610, "i" is increased by 1 in order to read the next pixel in operation S615.

Because "i" is currently 1, "i" becomes "2" (operation S615), and it is determined whether the second pixel of the foreground image 400 is the second chroma-key color in the current state in operation S620. In other words, it is determined whether n (at least 2) chroma-key colors have been applied among multiple chroma-key colors "m" by comparing the first pixel and the second pixel, which are two chroma-key colors "n".

In the case where the second pixel is not the second chroma-key color, it is determined once again whether the $i^{th}$ pixel of the foreground image 400 is the first chroma-key color in operation S605. Currently, "i" is "2".

In the case where the second pixel is the first chroma-key color, the pixel of the background image 170, which corresponds to the second pixel of the foreground image 400, is outputted in operation S610, and i is increased by 1 in order to read the next pixel in operation S615.

In operation S615, "i" is "2", and after the increase by 1, "i" is "3". It is determined whether the color, which has been applied to the pixel in the third pixel of the foreground image 400, is the second chroma-key color in operation S620.

If it is determined that the third pixel of the foreground image 400 is the second chroma-key color, it can be understood that the current state is the chroma-key-color-application area 420 where n chroma-key colors have been applied.

In the state where it is determined that the third pixel is the second chroma-key color, the value recorded in the $(i+1)^{th}$ pixel of the foreground image 400 is acquired in operation S625. Because "i" has been increased by 1 in the state where "i" is "3", the next pixel becomes the fourth pixel. The value recorded in the fourth pixel is the number of pixels "p" acquired in the MPU 300. Because the first pixel is the first chroma-key color, and the second and third pixels are the first and second chroma-key colors, the value is the number of pixels except the pixels (the first to third pixels), and the parity bit, which corresponds to the number of pixels "p" can be included. In other words, (p)=303(l)−3(n)=300.

If the number of pixels and the parity bit are acquired in operation S625, the background image 170 is outputted in the (i, i+p) area of the foreground image 400 in operation S630.

The (i, i+p) area is the area except the pixels of n chroma-key colors, which have been actually applied in the block 410, and the background image 170 is outputted in the area at a time in operation S630.

Because "i" is currently "3" and the number of pixels "p" is 300 in the (i, i+p) area, one horizontal line is outputted among 100 horizontal lines by outputting the background image 170 that corresponds to the (3, 300) area that includes the third pixel.

If the $(i+n+1)^{th}$ pixel is read in the state where one horizontal line is outputted, "i" is "3", and "p" is "300", it is determined whether the chroma-key color has been applied in the pixel where "i" is 303 in operation S640. The fact that i is 303 can mean the first pixel of the next horizontal line within the block 410 or can mean pixels except the block 410.

In the case where there are pixels which have not been outputted in the foreground image 400, operations S605 to S640 are repeatedly performed until all pixels are outputted.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

The method and apparatus of the present invention may provide the following aspects.

First, by using a plurality of chroma-key colors, a chroma-key-color-recognition error, which can be generated when using one chroma-key color, may be prevented.

Second, by applying the chroma key only to a predetermined area of the block where the chroma-key color can be applied to the foreground image, when composing the front image that can be changed by the video controller, additionally processing overhead is not generated.

Third, by applying the chroma-key colors to the pixels corresponding to the number of pixels recorded in the horizontal line, errors may be reduced despite many changes of the foreground image.

Fourth, because the parity bit is included, errors may be reduced.

What is claimed is:

1. An apparatus for outputting an image using a plurality of chroma-key colors, the apparatus comprising:
    a microprocessor unit (MPU) that applies at least two chroma-key colors to one boundary of an area included in a foreground image, and represents the size of the area adjacent to the chroma-key colors to set a block for the area; and
    a video controller that makes the block set by the MPU transparent to display an area of a background image covered by the foreground image, which overlaps the block.

2. The apparatus of claim 1, further comprising a display unit which displays the composite image of the foreground image and the background image output by the video controller.

3. The apparatus of claim 2, wherein if two or more of the chroma-key colors are applied among the multiple chroma-key colors stored in the chroma-key-color-storage unit, the block is recognized as a chroma-key-application area, and the composite image is composed using the chroma-key application area.

4. The apparatus of claim 3, wherein the MPU calculates a height and a width of the block where the chroma-key color is applied using a physically-fixed value of a display device and a pixel address.

5. The apparatus of claim 4, wherein the MPU calculates a number of pixels and records the number of pixels in a horizontal line included in the block, and the video controller outputs a number of background-image pixels as the number of the pixels calculated.

6. The apparatus of claim 5, wherein if the number of pixels of the horizontal line is less than a set number, the MPU applies the first chroma-key color among the chroma-key colors to the whole block, and if the number of the pixels is greater than the set number, the MPU applies a number n of chroma-key colors to the horizontal line, and records the number of the pixels in the $(n+1)^{th}$ pixel.

7. The apparatus of claim 6, wherein the $(n+1)^{th}$ pixel, where the number of the pixels is recorded, further comprises a parity bit.

8. The apparatus of claim 7, wherein the video controller composes the background image and the foreground image that comprises the chroma-key colors, the number of the pixels and the parity bit, and outputs the composed image.

* * * * *